United States Patent
Lopez et al.

(10) Patent No.: US 10,362,584 B2
(45) Date of Patent: Jul. 23, 2019

(54) MANAGEMENT AND MITIGATION OF NARROWBAND INTERFERENCE

(71) Applicant: Telefonaktiebolaget LM Ericsson (publ), Stockholm (SE)

(72) Inventors: Miguel Lopez, Solna (SE); Roland Carlsson, Öjersjö (SE); Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 161 days.

(21) Appl. No.: 15/548,670

(22) PCT Filed: Feb. 6, 2015

(86) PCT No.: PCT/SE2015/050131
§ 371 (c)(1),
(2) Date: Aug. 3, 2017

(87) PCT Pub. No.: WO2016/126179
PCT Pub. Date: Aug. 11, 2016

(65) Prior Publication Data
US 2018/0020458 A1   Jan. 18, 2018

(51) Int. Cl.
*H04W 72/08* (2009.01)
*H04L 27/00* (2006.01)
(Continued)

(52) U.S. Cl.
CPC ........ *H04W 72/082* (2013.01); *H04L 5/0073* (2013.01); *H04L 25/0202* (2013.01); *H04L 25/03* (2013.01); *H04L 27/0006* (2013.01); *H04W 72/0446* (2013.01); *H04B 1/71* (2013.01); *H04L 25/02* (2013.01);
(Continued)

(58) Field of Classification Search
CPC . H04L 1/0009; H04L 1/0045; H04L 25/0202; H04L 25/0204; H04L 25/0206; H04L 27/2626; H04W 84/18; H04W 84/12; H04W 4/70; H04W 72/08; H04W 72/082
See application file for complete search history.

(56) References Cited

U.S. PATENT DOCUMENTS

2006/0222097 A1   10/2006   Gupta et al.
2008/0043888 A1   2/2008    Bhukania et al.

OTHER PUBLICATIONS

Nikolova et al., "Narrowband Interference Suppression in Wireless OFDM Systems", Mar. 2009 (Year: 2009).*
(Continued)

*Primary Examiner* — Jae Y Lee
*Assistant Examiner* — Aixa A Guadalupe Cruz
(74) *Attorney, Agent, or Firm* — Rothwell, Figg, Ernst & Manbeck, p.c.

(57) ABSTRACT

A method performed by a transmitting station for assisting a receiving station in mitigating effects of a narrowband interference affecting the receiving station in a wireless communications network. The transmitting station determines (503) a likelihood of presence of the narrowband interference. When the likelihood of presence of the narrowband interference exceeds a threshold of the likelihood, the transmitting station sends (505) to the receiving station a recommendation to avoid smoothing of the channel estimates of the receiving station. The recommendation indicates a high likelihood of presence of the narrowband interference.

32 Claims, 8 Drawing Sheets

(51) Int. Cl.
*H04L 5/00* (2006.01)
*H04L 25/02* (2006.01)
*H04W 72/04* (2009.01)
*H04L 25/03* (2006.01)
*H04W 4/70* (2018.01)
*H04B 1/71* (2011.01)
*H04L 27/26* (2006.01)
*H04W 84/12* (2009.01)

(52) U.S. Cl.
CPC ............... *H04L 27/26* (2013.01); *H04W 4/70* (2018.02); *H04W 84/12* (2013.01)

(56) References Cited

OTHER PUBLICATIONS

International Search Report and Written Opinion issued in International Application No. PCT/SE2015/050131, dated Oct. 27, 2015, 11 pages.

Nawaz, R. and Sun, S, "Bluetooth Interference Mitigation in 802.11g", Communications, 2008, ICC '08, IEEE International Conference, May 19-23, 2008, pp. 930-935.

Zhang, Dan et al., "Receiver window design for narrowband interference suppression in IEEE 802.11a system", in Communications, 2004 and the 5th International Symposium on Multi-Dimensional Mobile Communications Proceedings, The 2004 Joint Conference of the 10th Asia-Pacific Conference, vol. 2, Aug. 29-Sep. 1, 2004, pp. 839-842.

Soltanian, A. et al., "Rejection of Bluetooth Interference in 802.11 WLANs", Vehicular Technology Conference , 2002, Proceedings, VTC 2002-Fall 2002 IEEE 56th, vol. 2, pp. 932-936.

* cited by examiner

300

MANAGEMENT AND MITIGATION OF NARROWBAND INTERFERENCE

CROSS REFERENCE TO RELATED APPLICATION(S)

This application is a 35 U.S.C. § 371 National Stage of International Patent Application No. PCT/SE2015/050131, filed Feb. 6, 2015, designating the United States, the disclosure of which is incorporated by reference.

TECHNICAL FIELD

Embodiments herein relate to a transmitting station, a receiving station and methods therein for mitigating effects of narrowband interference.

BACKGROUND

A Wireless Local Area Network (WLAN) is a wireless computer network that links two or more devices using a wireless distribution method, often spread-spectrum or Orthogonal Frequency Division Multiplexing (OFDM) radio, within a limited area such as a home, school, computer laboratory, or office building. This gives users the ability to move around within a local coverage area and still be connected to the network, and may provide a connection to the wider Internet. Most modern WLANs are based on IEEE 802.11 standards, marketed under the W-Fi brand name.

All components that may connect into a wireless medium in a WLAN are referred to as STAtions (STA). Wireless stations fall into one of two categories: wireless Access Points (AP) and clients.

APs, normally wireless routers, are base stations for the wireless network. They transmit and receive radio frequencies for wireless enabled devices to communicate with. Wireless clients may be mobile devices such as laptops, personal digital assistants, IP phones and other smartphones, or fixed devices such as desktops and workstations that are equipped with a wireless network interface.

A Basic Service Set (BSS) is a set of all stations that can communicate with each other.

IEEE 802.11ah is a wireless networking protocol that is an amendment of the IEEE 802.11-2007 wireless networking standard. It utilizes sub 1 GHz license-exempt bands to provide extended range W-Fi networks, compared to conventional Wi-Fi networks operating in the 2.4 GHz and 5 GHz bands. It also benefits from lower energy consumption, allowing the creation of large groups of stations or sensors that cooperate to share the signal, supporting the concept of the Internet of Things (IoT).

Many important use cases for 802.11ah involve low duty cycle, battery driven STAs, where power efficiency is paramount. For this reason, a new sensor type STA has been introduced in 802.11ah. These devices are expected to operate for several years powered by small batteries.

Weightless is a radio access standard intended for Machine-to-Machine (M2M) communication and IoT applications. The Weightless-N standard, designed to operate in the 900 MHz Industrial, Scientific and Medical (ISM) bands, is currently under development and is expected to be finished in 2015. Weightless-N is expected to provide coverage in the order of tens of km. The carrier bandwidths are expected to be very narrow, most likely less than 1 kHz.

The coverage of 802.11ah is less than 1 km. Therefore, in regions where Weightless-N and 802.11ah networks coexist, it is likely that many 802.11ah BSSs will be located within the area of coverage of one Weightless-N base station, as illustrated in FIG. 1. This means that Weightless narrowband interference will impact the performance of 802.11ah networks. For example, strong narrowband interference causes the channel estimates in the affected subcarriers to be very noisy.

SUMMARY

An object of embodiments herein is to improve the performance of a receiving station.

According to a first aspect of embodiments herein, the object is achieved by a method performed by a transmitting station for assisting a receiving station in mitigating effects of a narrowband interference affecting the receiving station in a wireless communications network.

The transmitting station determines a likelihood of presence of the narrowband interference.

When the likelihood of presence of the narrowband interference exceeds a threshold of the likelihood, the transmitting station sends to the receiving station a recommendation to avoid smoothing of the channel estimates of the receiving station, which recommendation indicates a high likelihood of presence of the narrowband interference.

According to a second aspect of embodiments herein, the object is achieved by a transmitting station for assisting a receiving station in mitigating effects of a narrowband interference affecting the receiving station in a wireless communications network.

The transmitting station is configured to determine a likelihood of presence of the narrowband interference.

The transmitting station is further configured to send to the receiving station a recommendation to avoid smoothing of the channel estimates of the receiving station when the likelihood of presence of the narrowband interference exceeds a threshold of the likelihood. The recommendation indicates a high likelihood of presence of the narrowband interference.

According to a third aspect of embodiments herein, the object is achieved by a method performed by a receiving station for mitigating effects of a narrowband interference affecting the receiving station in a wireless communications network.

The receiving station obtains an indication of a high likelihood of presence of the narrowband interference.

The receiving station adjusts based on the indication, a soft information related to a user data bit.

According to a fourth aspect of embodiments herein, the object is achieved by a method performed by the receiving station for mitigating effects of the narrowband interference affecting the receiving station.

The receiving station obtains an indication of a high likelihood of presence of the narrowband interference.

The receiving station avoids smoothing of the channel estimates of the receiving station based on the indication.

According to a fifth aspect of embodiments herein, the object is achieved by a receiving station for mitigating effects of a narrowband interference affecting the receiving station in a wireless communications network. The receiving station is configured to obtain an indication of a high likelihood of presence of the narrowband interference, and configured to adjust, based on the indication, a soft information related to a user data bit.

According to a sixth aspect of embodiments herein, the object is achieved by the receiving station configured to obtain an indication of a high likelihood of presence of the narrowband interference, and configured to avoid smoothing of the channel estimates of the receiving station based on the indication.

The transmitting station sends the recommendation to avoid smoothing when the likelihood of presence of the narrowband interference exceeds the threshold of the likelihood. The receiving station is assisted in mitigating the narrowband interference since channel estimation noise is not spread to adjacent subcarrier channel estimates when channel smoothing is not applied. Hence, the channel estimation is not degraded also for the sub-carriers that are not directly affected by the interference.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed. WiFi will be used as an example of a wireless communications network in which the problem may arise.

Channel smoothing, or smoothing of channel estimates, at a receiver typically gives performance gains in the order of 1-2 dB. Channel smoothing correspond to a function that use the fact that the channel for neighbouring frequency slots are highly correlated. In order to increase the signal to noise and interference ratio of the channel estimate for a specific frequency interval, the estimate will be a weighted sum of the estimates of its own as well as of the neighbouring frequency interval. Moving average is one example of weighted sum. In general, channel smoothing is advantageous whenever beamforming is not applied at a transmitter. Current WiFi products do not implement beamforming, and it is not likely that beamforming will be used in many 802.11ah applications, since it involves a large overhead and much signaling, both of which are undesirable for low cost, low duty cycle devices. An example of smoothing is a moving average.

Figure 1:
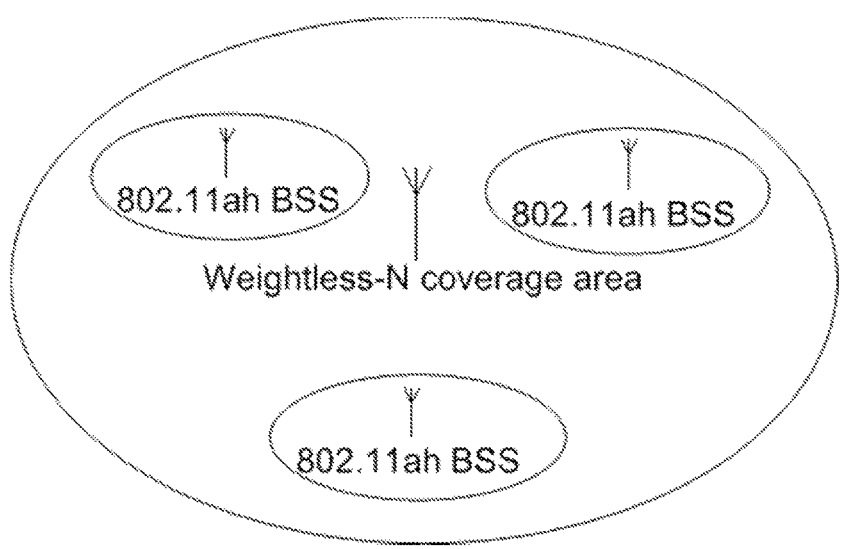
FIG. 1 is a block diagram illustrating a coverage area of a first wireless communications network and three coverage areas of a second wireless communications network.
Figure 2:
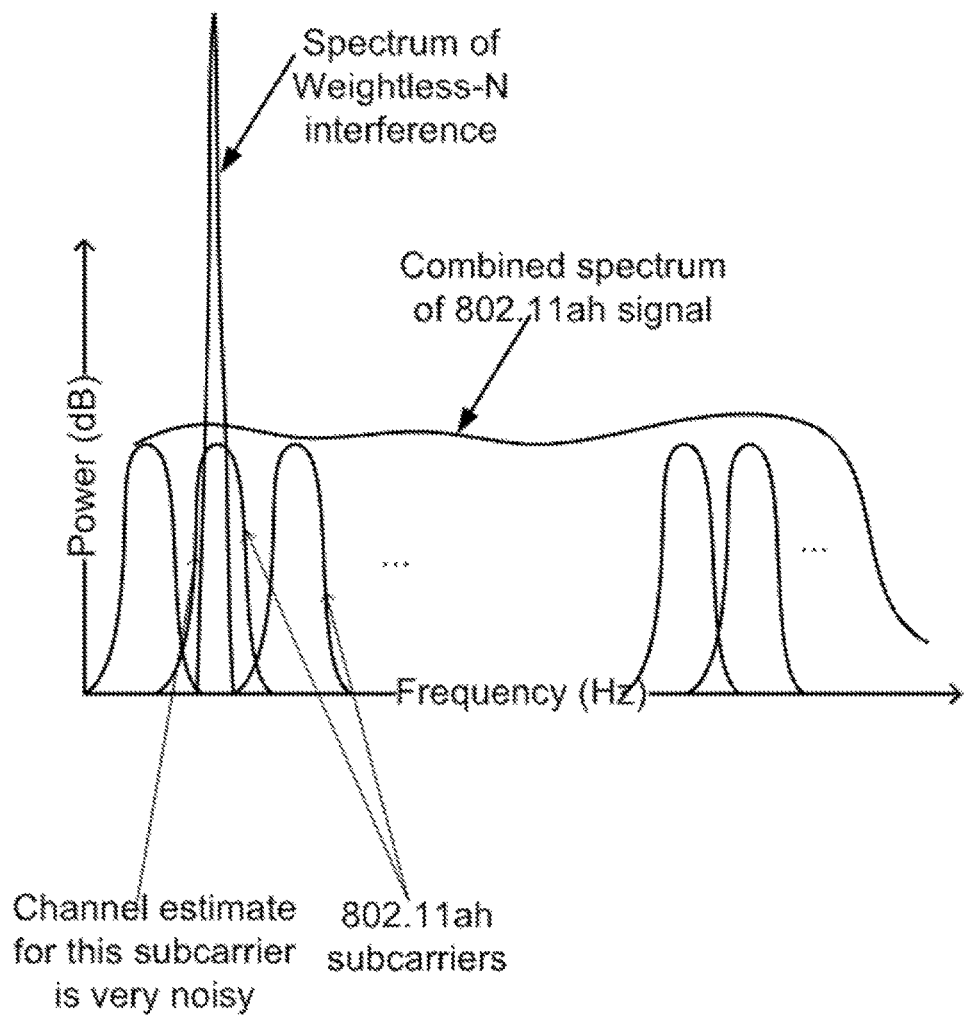
FIG. 2 illustrates power spectra of 802.11ah signals and of a weightless-N signal.

Smoothing is often employed in 802.11 STAs, and it is expected that smoothing will be widespread in 802.11ah receivers. However, when narrowband interference, e.g. Weightless-N interference, is present, smoothing may actually degrade performance. The reason is that narrowband interference affects more some subcarriers than others. FIG. 2 illustrates power spectra of 802.11ah signals and of a weightless-N signal. Smoothing spreads the channel estimation errors over the whole band of operating frequencies.

Strong narrowband interference causes the channel estimates in the affected subcarriers to be very noisy. This channel estimation noise is spread to adjacent subcarrier channel estimates when channel smoothing is applied. Hence, the channel estimation is degraded also for the sub-carriers that are not severely affected by the interference.

The 802.11ah standard introduced a sub 1 GHz (S1G) Physical (PHY) specification. This PHY specification provides support for 1 MHz, 2 MHz, 4 MHz, 8 MHz and 16 MHz channel bandwidths. In addition, three types of Physical Protocol Data Unit (PPDU) are defined:

S1G_1 MHz for 1 MHz bandwidth.
SHORT for 2 MHz bandwidth and above.
LONG, also for 2 MHz bandwidth and above.

The LONG PPDU's provide functionality necessary to support Multi-User Multiple Input Multiple Output (MU-MIMO), while the S1G_1 MHz and SHORT PPDUs only support Single-User MIMO (SU-MIMO). The PHY header in all three packet formats is contained in the packet preamble and includes a Smoothing Indication bit. This bit indicates whether smoothing the channel (over adjacent sub-carriers) is recommended. The smoothing bit was introduced in an earlier version of the 802.11 standard, namely in the High Throughput (HT) amendment.

In embodiments herein a transmitting station, e.g. an Access Point (AP) in a WiFi network, such as a 802.11ah network, monitors the interference levels in the network. If high levels of narrowband interference are detected in the band of operation of a given receiving station, then the transmitting station recommends the receiving station to avoid smoothing, e.g. by reducing or adjusting a recommendation in a smoothing indication sent to the receiving station. The transmitting station may for example set the smoothing indication bit to 0 in the packets directed to said receiving station. This will help the receiving station to protect itself from narrowband interference, e.g. Weightless-N interference, by preventing error propagation due to smoothing.

Power consumption is critical in battery driven STAs, for example sensor type STAs and especially low-duty cycle STAs. Monitoring interference and applying interference suppression algorithms consumes power. Embodiments herein shift the burden of narrowband interference detection from the receiving STA to the transmitting STA. This is especially useful when the transmitting STA is an AP or a relay AP and the receiving STA is a sensor STA.

The performance of 802.11ah STAs in the presence of narrowband interference may be improved without any increase in computational complexity at the STA.

Embodiments herein are compatible with all 802.11ah STAs, including the sensor type STAs.

The embodiments herein will now be illustrated in more detail by a number of exemplary embodiments. It should be noted that the following embodiments are not mutually exclusive. Components from one embodiment may be tacitly assumed to be present in another embodiment and it will be obvious to a person skilled in the art how those components may be used in the other exemplary embodiments.

Figure 3:
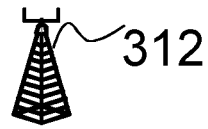
FIG. 3 is a schematic block diagram illustrating embodiments of a wireless communications network.
Figure 3:
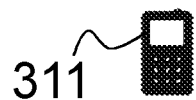

Embodiments herein may be implemented in one or more wireless communications networks whereof FIG. 3 depicts parts of a wireless communications network 300, also known as radio communications network, a telecommunications network or similar. The wireless communication network 300 is exemplified herein as a WiFi network, but a number of different technologies may be used. For example, Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In the wireless communication network 300, a receiving station 311, also known as a mobile station, wireless device, a user equipment and/or a wireless terminal, is configured to communicate with the wireless communications network 300. It should be understood by the skilled in the art that "user equipment" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station.

The receiving station 311 may communicate with the wireless communications network 300 through one or more transmitting stations, such as a transmitting station 312. The transmitting station 312 may for example be an AP in a WiFi network. In some embodiments herein the receiving station 311 is a sensor type station.

Figure 4:
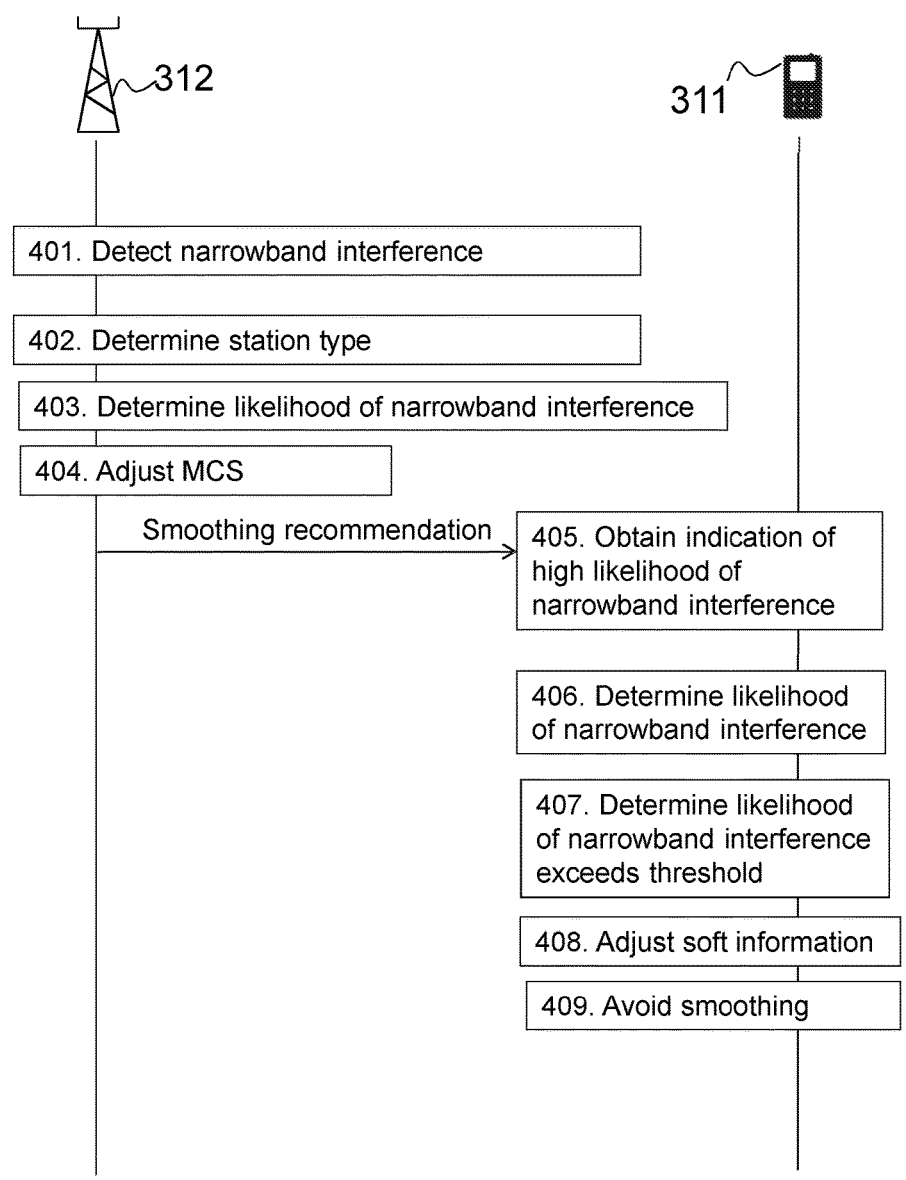
FIG. 4 is a combined block diagram and flow chart illustrating a method in a wireless communication network.

FIG. 4 is a combined signalling diagram and flow chart that describes actions that may take place for mitigating effects of a narrowband interference affecting the receiving station 311 in the wireless communications network 300 according to embodiments herein.

Action 401

The transmitting station 312 continuously monitors the medium, i.e. it listens and attempts to decode all incoming transmissions.

In 802.11ah it may happen that the transmitting station 312, is capable of receiving and transmitting in a bandwidth that exceeds the bandwidth of the receiving stations. For example the transmitting station 312 may be capable of operating over a bandwidth of 16 MHz, but the receiving station 311 only over a 2 MHz sub-bandwidth. Then the transmitting station 312 only need to take action if narrowband interference exist within the 2 MHz sub-bandwidth that is used for transmission to the receiving station 311.

The transmitting station 312 may detect the narrowband interference in the band of operation of the receiving station 311. The detection may comprise detecting a center of frequency of the narrowband interference and a bandwidth of the narrowband interference.

This action is related to action 501 below.

Action 402

The transmitting station 312 may determine that the receiving station 311 is a sensor type station. Then the transmitting station 312 knows that the processing capabilities of the receiving station 311 are limited. The following actions may be performed conditionally if the receiving station 311 is the sensor type station, since then the transmitting station 312 has high incentive to perform the actions below.

This action is related to action 502 below.

Action 403

The transmitting station 312 determines a likelihood of presence of the narrowband interference. For example, the transmitting station 312 may determine the likelihood of presence of the narrowband interference during a next packet transmission.

In some embodiments determining the likelihood of presence of the narrowband interference comprises computing a time slot occupancy of the narrowband interference, i.e. a fraction of air time occupied by the narrowband interference, and determining whether the time slot occupancy exceeds a threshold.

Determining the likelihood of presence of the narrowband interference may comprise determining a peak of the interference power spectrum density. Then the likelihood of presence of the narrowband interference exceeds the threshold of the likelihood when the peak of the interference power spectrum density exceeds a threshold of an interference power spectrum density.

In some embodiments determining the likelihood of presence of the narrowband interference further comprises determining any one or more out of: the center of frequency of the narrowband interference and the bandwidth of the narrowband interference. Determining the center of frequency may be needed to find out which sub-channels are affected. The bandwidth of the narrowband interference is also useful to determine if the interference spills over 2 sub-channels. This is related to detecting the narrowband interference in the band of operation of the receiving station 311.

This action is related to action 503 below.

Action 404

The transmitting station 312 may further make some adjustments in a transmission scheme in order to enhance the probability that the receiving station 311 can decode data correctly although the receiving station 311 is affected by the narrowband interference. The transmitting station 312 may adjust the transmission scheme only for data that will be affected by the narrowband interference.

For example, the transmitting station 312 may adjust the Modulation and Coding Scheme, MCS, of the next packet based on the determining that the likelihood of presence of the narrowband interference during the next packet transmission exceeds the threshold of the likelihood. For example, a lower code rate may be chosen in order for the next packet transmission to be more robust against the narrowband interference.

Also, the transmitting station 312 may adjust the number of layers transmitted in SU-MIMO of the next packet based on the determining that the likelihood of presence of the narrowband interference exceeds the threshold of the likelihood.

In some embodiments the transmitting station 312 reduces the number of users in case of MU-MIMO.

A transmission power may also be adjusted.

This action is related to action 504 below.

Action 405

The receiving station 311 obtains an indication of the high likelihood of presence of the narrowband interference in order for the receiving station 311 to take actions against the effects of the narrowband interference.

In some embodiments obtaining the indication of the high likelihood of presence of the narrowband interference comprises receiving the indication from the transmitting station 312. Then the indication is indicated by a recommendation to avoid smoothing of the channel estimates of the receiving station 311, since channel smoothing spreads channel estimation noise to adjacent subcarrier channel estimates. For example, when the likelihood of presence of the narrowband interference exceeds the threshold of the likelihood, the transmitting station 312 sends to the receiving station 311 a recommendation to avoid smoothing of the channel estimates of the receiving station 311. The recommendation indicates the high likelihood of presence of the narrowband interference.

In some embodiments the recommendation regarding smoothing is a smoothing indication bit. For example, if the transmitting station 312 determines that narrowband interference is likely to occur during the next packet then it may override the value of the Smoothing Indication bit in the PHY header of said packet and set it to 0, i.e. channel smoothing not recommended.

In some other embodiments the value of the Smoothing Indication bit is overridden only if the narrowband interference has been detected in the band of operation of the receiving station 311.

In yet some other embodiments the value of the Smoothing Indication bit is overridden and set to 0 only if the transmitting station 312 has determined that narrowband interference is likely and the receiving station 311 is the sensor type station.

In some other embodiments obtaining the indication of the high likelihood of presence of the narrowband interference comprises detecting the narrowband interference by the receiving station 311.

This action is related to action 505 and action 701 below.

Action 406

For those embodiments in which the receiving station 311 detects the narrowband interference itself, obtaining the indication of the high likelihood of presence of the narrowband interference may further comprise determining the likelihood of presence of the narrowband interference.

In another embodiment the receiving station 311 only tries to detect and/or determine the narrowband interference if the Smoothing Indication bit is set to 0, i.e. the transmitting station 312 indicates that there is high probability that there exists narrowband interference.

For OFDM systems the receiving station 311 may determine the likelihood of presence of the narrowband interference for an OFDM symbol.

This action is related to action 703 below.

Action 407

The receiving station 311 may further determine that the likelihood of presence of the narrowband interference exceeds a threshold of the likelihood.

This action is related to action 704 below.

Action 408

When narrowband interference affects the receiving station 311 the reliability of the bit estimates may be decreased. Therefore, the receiving station 311 may adjust a soft information related to a user data bit. The adjusting is based on the indication of the high likelihood of presence of the narrowband interference. The soft information, or soft value, is an estimate of the reliability of the bit estimates. The demodulator computes the soft information.

In some embodiments the soft information is only adjusted for a user data bit that is affected by the interference. Naturally, the receiving station 311 may adjust the soft information related to several user data bits.

In some embodiments adjusting the soft information comprises reducing a soft value related to the user data bit. For example, the soft value may be set to zero.

The interference power from a narrowband interferer is not spread uniformly, in the frequency domain, over the operating band of the receiving station 311. The usual assumption in 802.11 receivers is that the noise power is independent of the subcarrier. Hence, the performance may be further improved in 802.11ah receivers by taking into account the spectrum of the interference.

In one embodiment the receiving station 311 estimates the total noise plus narrowband interference power per subcarrier, and scales the soft values accordingly. Thus, the soft values carried by Binary Phase Shift Keying (BPSK), Quarternary Phase Shift Keying (QPSK) or Quadrature Amplitude Modulation (QAM) symbols in each subcarrier are weighted according to a subcarrier specific weight.

In one embodiment the receiving station 311 estimates which subcarriers are affected by the narrowband interference and the soft values are set to zero for the bits which are carried by subcarriers impacted by the interference.

In another embodiment, the presence of narrowband interference is determined for each OFDM symbol, since the time duration of the said interference is unknown. This makes it possible to get best possible performance for each OFDM symbol.

The embodiments mentioned in this action may for example be carried out by receiving stations connected to a continuous power supply. Typical examples are relay stations.

This action is related to action 705 below.

Action 409

In another embodiment the receiving station 311 avoids smoothing of the channel estimates of the receiving station 311 based on the indication, since channel smoothing spreads channel estimation noise to adjacent subcarrier channel estimates.

Figure 5:
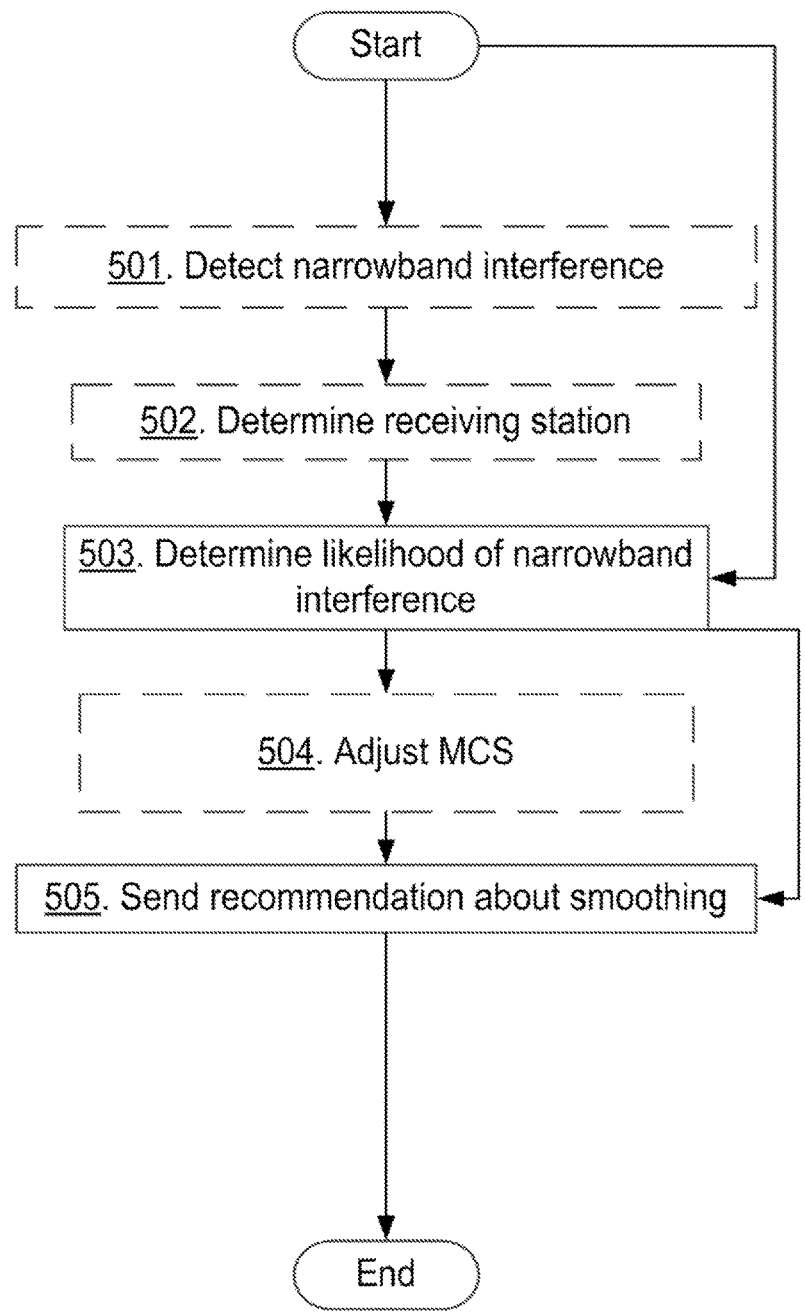
FIG. 5 is a flowchart illustrating embodiments of a method in a transmitting station.

FIG. 5 is a flow chart that illustrates embodiments of a method performed by a transmitting station 312 for assisting a receiving station 311 in mitigating effects of a narrowband interference affecting the receiving station 311 in a wireless communications network 300.

As mentioned above the transmitting station 312 may be an AP in an 802.11 network. In some embodiments the receiving station 311 is of the sensor type.

The method comprises the following actions, which actions may be taken in any suitable order.

Action 501

The transmitting station 312 may detect narrowband interference in the band of operation of the receiving station 311.

This action is related to action 401 above.

Action 502

In some embodiments the transmitting station 312 determines that the receiving station 311 is the sensor type station.

This action is related to action 402 above.

Action 503

The transmitting station 312 determines the likelihood of presence of the narrowband interference.

Determining the likelihood of presence of the narrowband interference may comprises computing the time slot occupancy of the narrowband interference.

In some embodiments determining the likelihood of presence of the narrowband interference comprises determining the peak of the interference power spectrum density. Then the likelihood of presence of the narrowband interference exceeds the threshold of the likelihood when the peak of the interference power spectrum density exceeds the threshold of an interference power spectrum density.

Determining the likelihood of presence of the narrowband interference may further comprise determining any one or more out of: the center of frequency of the narrowband interference and the bandwidth of the narrowband interference. As mentioned in action 403, determining the center of frequency may be needed to find out which sub-channels are affected. The bandwidth of the narrowband interference is also useful to determine if the interference spills over 2 sub-channels.

When OFDM is used determining the likelihood of presence of the narrowband interference may comprise determining the likelihood of presence of narrowband interference for an OFDM symbol.

Power consumption is critical in battery driven STAs, for example sensor type STAs and especially low-duty cycle STAs. Monitoring interference and applying interference suppression algorithms consumes power. Embodiments herein shift the burden of narrowband interference detection from the receiving station 311 to the transmitting station 312. This is especially useful when the transmitting station 312 is an AP or a relay AP and the receiving station 311 is a sensor STA.

This action is related to action 403 above.

Action 504

In some embodiments the transmitting station 312 adjusts the MCS of the next packet based on the determining that the likelihood of presence of the narrowband interference during the next packet transmission exceeds the threshold of the likelihood.

This action is related to actions 404 above.

Action 505

When the likelihood of presence of the narrowband interference exceeds the threshold of the likelihood, the transmitting station 312 sends to the receiving station 311 the recommendation to avoid smoothing of the channel estimates of the receiving station 311. The recommendation indicates the high likelihood of presence of the narrowband interference.

The recommendation regarding smoothing may be the smoothing indication bit.

This action is related to action 405 above.

Figure 6:
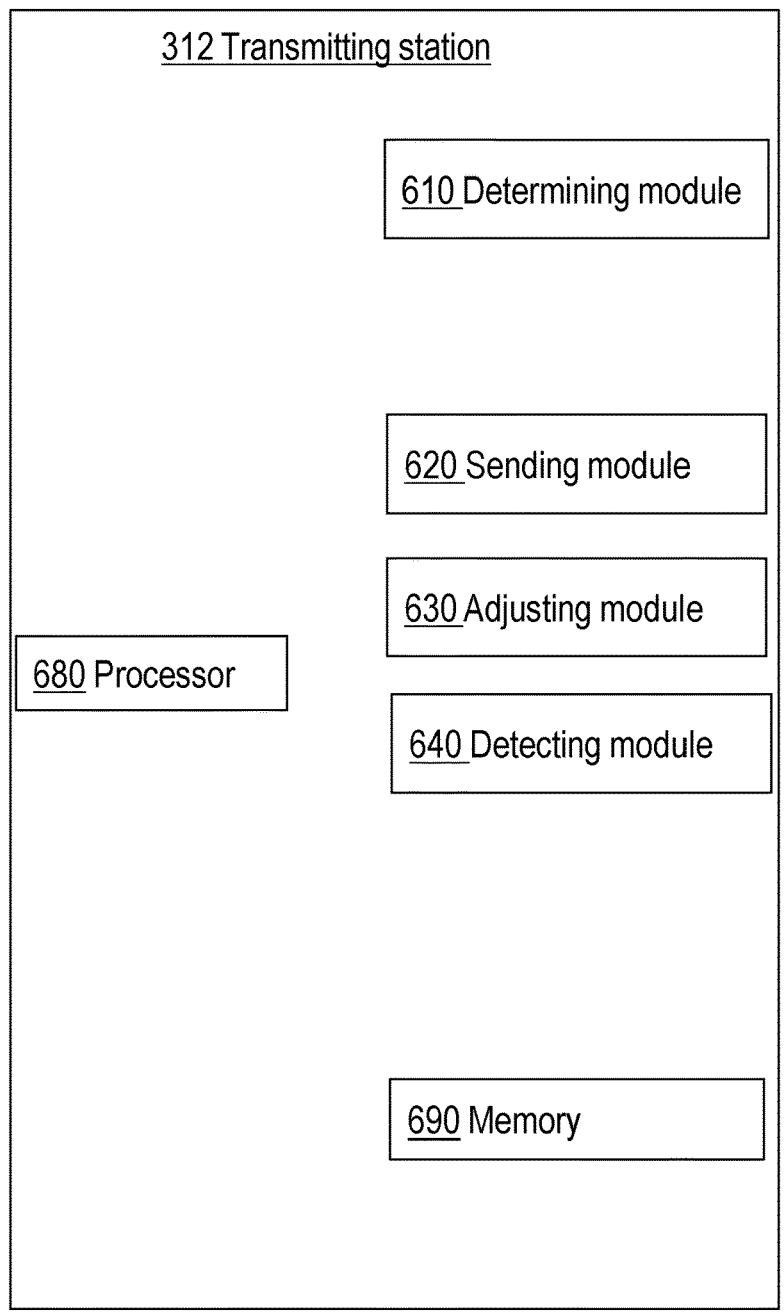
FIG. 6 is a schematic block diagram embodiments of a transmitting station.

To perform the method actions for assisting the receiving station 311 in mitigating effects of the narrowband interference affecting the receiving station 311 in the wireless communications network 300 described above in relation to FIG. 5, the transmitting station 312 comprises the following arrangement depicted in FIG. 6.

As mentioned above the transmitting station 312 may be an AP in an 802.11 network. In some embodiments the receiving station 311 is of the sensor type.

The transmitting station 312 is configured to, e.g. by means of an determining module 610 configured to, determine the likelihood of presence of the narrowband interference.

In some embodiments the transmitting station 312 is configured to determine the likelihood of presence of the narrowband interference by computing the time slot occupancy of the narrowband interference.

The transmitting station 312 may be configured to determine the likelihood of presence of the narrowband interference by determining the peak of the interference power spectrum density, and wherein the likelihood of presence of the narrowband interference exceeds the threshold of the likelihood when the peak of the interference power spectrum density exceeds the threshold of an interference power spectrum density.

In some embodiments the transmitting station 312 is configured to determine the likelihood of presence of the narrowband interference by determining any one or more out of: the center of frequency of the narrowband interference and the bandwidth of the narrowband interference.

The determining module 610 may be implemented by a processor 680 in the transmitting station 312.

The transmitting station 312 is further configured to, e.g. by means of a sending module 620 configured to, send to the receiving station 311 the recommendation to avoid smoothing of the channel estimates of the receiving station 311, which recommendation indicates the high likelihood of presence of the narrowband interference, when the likelihood of presence of the narrowband interference exceeds the threshold of the likelihood.

The recommendation regarding smoothing may be the smoothing indication bit.

The sending module 620 may be implemented by a transmitter in the transmitting station 312.

The transmitting station 312 may be further configured to, e.g. by means of an adjusting module 630 configured to, adjust the MCS of the next packet based on that the likelihood of presence of the narrowband interference during the next packet transmission exceeds the threshold of the likelihood.

The adjusting module 630 may be implemented by the processor 680 in the transmitting station 312.

The transmitting station 312 may be further configured to, e.g. by means of a detecting module 640 configured to, detect narrowband interference in the band of operation of the receiving station 311.

The adjusting module 630 may be implemented by the processor 680 in the transmitting station 312.

The transmitting station 312 may be further configured to, e.g. by means of the determining module 610 configured to, determine that the receiving station 311 is the sensor type station.

The embodiments herein for assisting the receiving station 311 in mitigating effects of the narrowband interference affecting the receiving station 311 in the wireless communications network 300 may be implemented through one or more processors, such as the processor 680 in the transmitting station 312 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the transmitting station 312. One such carrier may be in the form of a CD ROM disc. It is however feasible with other data carriers such as a memory stick. The computer program code may furthermore be provided as pure program code on a server and downloaded to the transmitting station 312.

Thus, the methods according to the embodiments described herein for the transmitting station 312 may be implemented by means of a computer program product, comprising instructions, i.e., software code portions, which, when executed on at least one processor, cause the at least one processor to carry out the actions described herein, as performed by the transmitting station 312. The computer program product may be stored on a computer-readable storage medium. The computer-readable storage medium, having stored there on the computer program, may comprise the instructions which, when executed on at least one processor, cause the at least one processor to carry out the actions described herein, as performed by the transmitting station 312. In some embodiments, the computer-readable storage medium may be a non-transitory computer-readable storage medium.

Those skilled in the art will also appreciate that the determining module 610, the sending module 620, the adjusting module 630, and the detecting module 640 described above may refer to a combination of analogue and digital circuits, and/or one or more processors configured with software and/or firmware, e.g. stored in a memory 690, that when executed by the one or more processors such as the processor 680 perform as described above. One or more of these processors, as well as the other digital hardware, may be included in a single ASIC, or several processors and various digital hardware may be distributed among several separate components, whether individually packaged or assembled into a SoC.

Figure 7:
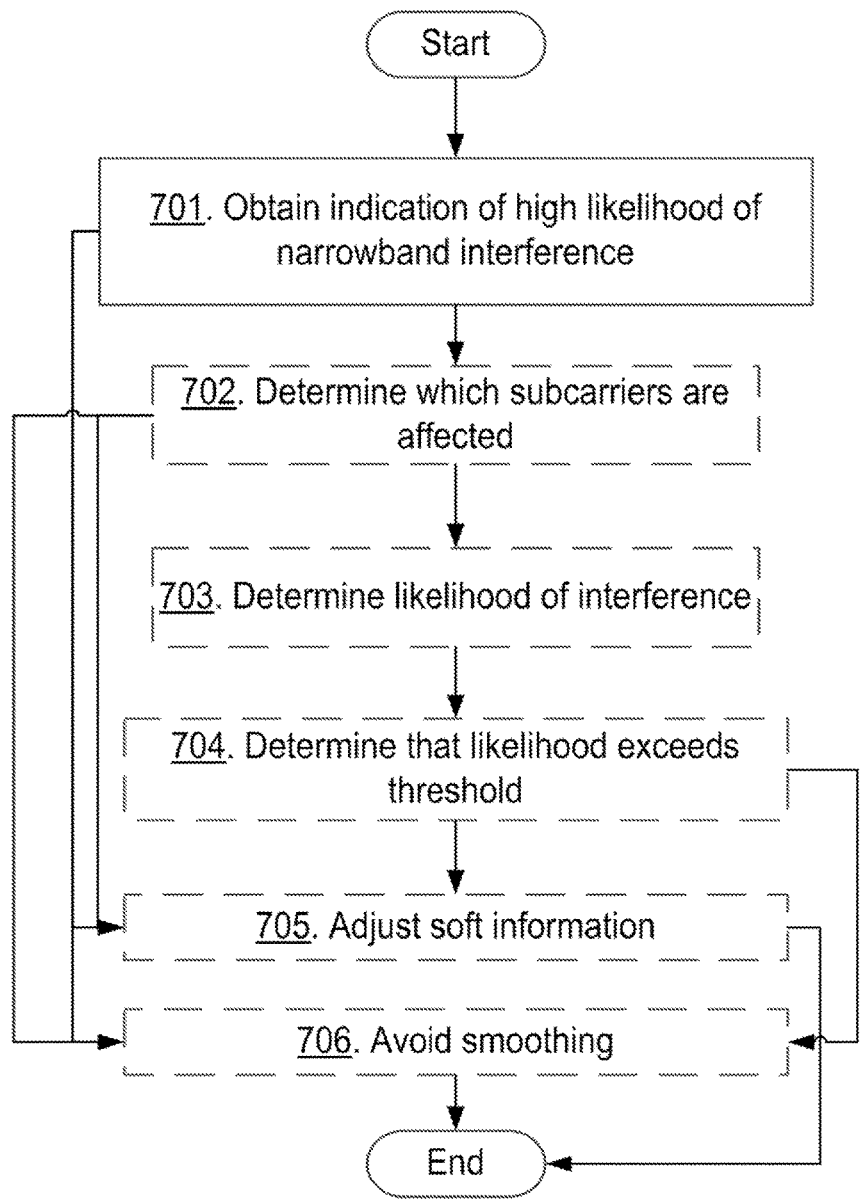
FIG. 7 is a flowchart illustrating embodiments of a method in a receiving station.

FIG. 7 is a flow chart that illustrates embodiments of a method performed by the receiving station 311 for mitigating effects of the narrowband interference affecting the receiving station 311 in the wireless communications network 300.

As mentioned above the transmitting station 312 may be an AP in an 802.11 network. In some embodiments the receiving station 311 is of the sensor type.

The method comprises the following actions, which actions may be taken in any suitable order.

Action 701

The receiving station 311 obtains an indication of the high likelihood of presence of the narrowband interference.

In some embodiments the receiving station 311 obtains the indication of the high likelihood of presence of the narrowband interference by receiving the indication from the transmitting station 312. Then the indication is indicated by the recommendation to avoid smoothing of the channel estimates of the receiving station 311.

In some other embodiments the receiving station 311 obtains the indication of the high likelihood of presence of the narrowband interference by detecting the narrowband interference.

This action is related to action 405 above.

Action 702

In some embodiments, e.g. when OFDM is used, the receiving station 311 determines which subcarriers that are affected by the narrowband interference.

Action 703

The receiving station 311 may determine the likelihood of presence of the narrowband interference.

When OFDM is used determining the likelihood of presence of the narrowband interference may comprise determining the likelihood of presence of narrowband interference for an OFDM symbol.

This action is related to action 406 above.

Action 704

In some embodiments the receiving station 311 determines that the likelihood of presence of the narrowband interference exceeds the threshold of the likelihood. The receiving station 311 may for example perform other actions conditionally on whether the likelihood of presence of the narrowband interference exceeds the threshold of the likelihood.

This action is related to actions 407 above.

Action 705

The receiving station 311 may adjust, based on the indication, the soft information related to the user data bit.

In some embodiments the receiving station 311 adjusts the soft information related to the user data bit which is affected by the interference. In this way extra processing power is only used for user data bits that may benefit from the extra processing.

This action is related to action 408 above.

Action 706

In some embodiments the receiving station 311 avoids smoothing of the channel estimates of the receiving station 311 based on the indication. The receiving station 311 mitigates the narrowband interference since channel estimation noise is not spread to adjacent subcarrier channel estimates when channel smoothing is not applied. Hence, the channel estimation is not degraded for the sub-carriers that are not directly affected by the interference.

This action is related to action 409 above.

Figure 8:
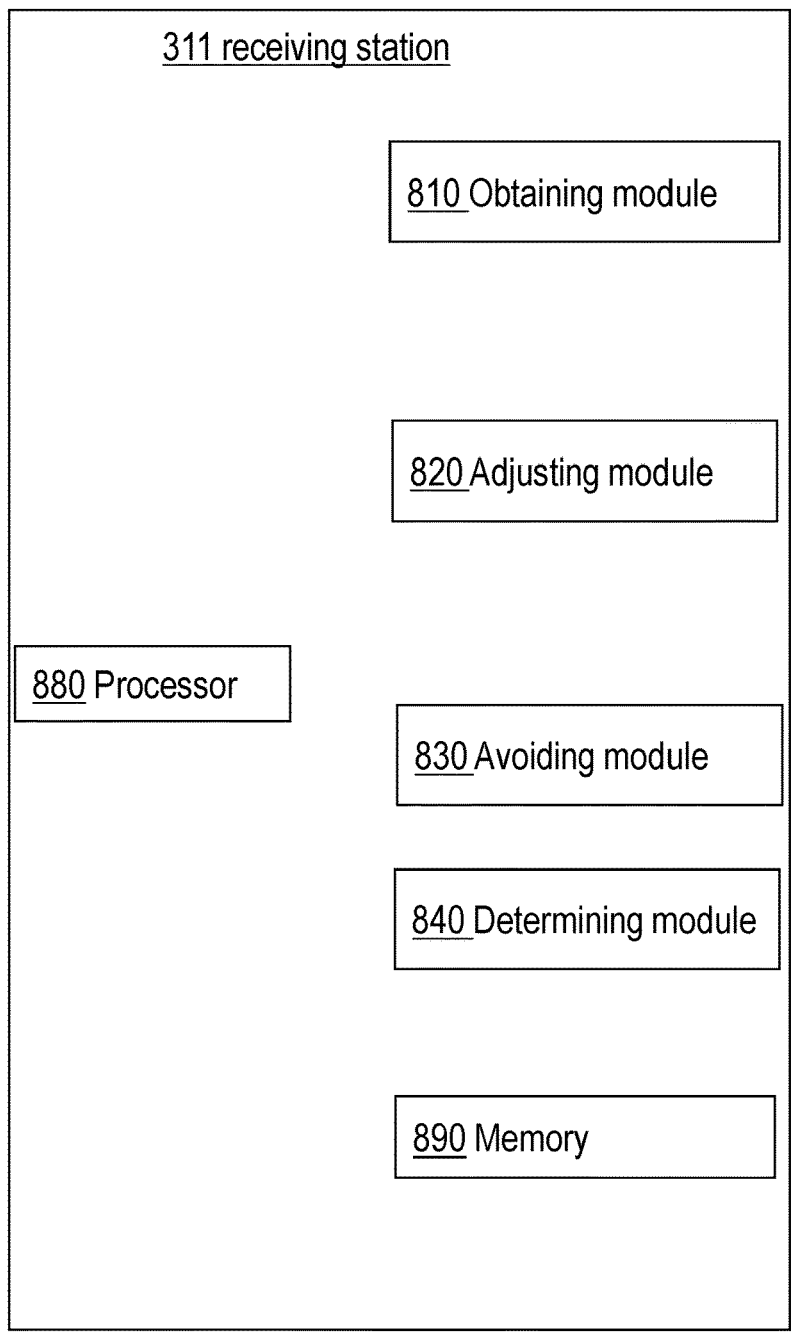
FIG. 8 is a schematic block diagram illustrating embodiments of a receiving station.

To perform the method actions for mitigating effects of the narrowband interference affecting the receiving station 311 in the wireless communications network 300 described above in relation to FIG. 7, the receiving station 311 comprises the following arrangement depicted in FIG. 8.

As mentioned above the transmitting station 312 may be an AP in an 802.11 network. In some embodiments the receiving station 311 is of the sensor type.

The receiving station 311 is configured to, e.g. by means of an obtaining module 810 configured to, obtain an indication of the high likelihood of presence of the narrowband interference.

In some embodiments the receiving station 311 is configured to obtain the indication of the high likelihood of presence of the narrowband interference by receiving the indication from the transmitting station 312. Then the indication is indicated by the recommendation to avoid smoothing of the channel estimates of the receiving station 311.

The receiving station 311 may further be configured to obtain the indication of the high likelihood of presence of the narrowband interference by detecting the narrowband interference.

The obtaining module 810 may be implemented by a processor 880 in the receiving station 311.

The receiving station 311 may be further configured to, e.g. by means of an adjusting module 820 configured to, adjust, based on the indication, the soft information related to the user data bit.

The receiving station 311 may further be configured to adjust the soft information related to the user data bit which is affected by the interference.

The adjusting module 820 may be implemented by the processor 880 in the receiving station 311.

The receiving station 311 may be further configured to, e.g. by means of an avoiding module 830 configured to, avoid smoothing of the channel estimates of the receiving station 311 based on the indication.

The avoiding module 830 may be implemented by the processor 880 in the receiving station 311.

The receiving station 311 may be further configured to, e.g. by means of a determining module 840 configured to, determine the likelihood of presence of the narrowband interference.

The receiving station 311 may further be configured to determine that the likelihood of presence of the narrowband interference exceeds the threshold of the likelihood.

In some embodiments the receiving station 311 is configured to determine the likelihood of presence of the narrowband interference by determining the likelihood of presence of narrowband interference for an OFDM symbol.

The determining module 840 may be implemented by the processor 880 in the receiving station 311.

The embodiments herein for mitigating effects of the narrowband interference affecting the receiving station 311 in the wireless communications network 300 may be implemented through one or more processors, such as the processor 880 in the receiving station 311 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the receiving station 311. One such carrier may be in the form of a CD ROM disc. It is however feasible with other data carriers such as a memory stick. The computer program code may furthermore be provided as pure program code on a server and downloaded to the receiving station 311.

Thus, the methods according to the embodiments described herein for the receiving station 311 may be implemented by means of a computer program product, comprising instructions, i.e., software code portions, which, when executed on at least one processor, cause the at least one processor to carry out the actions described herein, as performed by the receiving station 311. The computer program product may be stored on a computer-readable storage medium. The computer-readable storage medium, having stored there on the computer program, may comprise the instructions which, when executed on at least one processor, cause the at least one processor to carry out the actions described herein, as performed by the receiving station 311. In some embodiments, the computer-readable storage medium may be a non-transitory computer-readable storage medium.

Those skilled in the art will also appreciate that the obtaining module 810, the adjusting module 820, the avoiding module 830, and the determining module 840 described above may refer to a combination of analogue and digital circuits, and/or one or more processors configured with software and/or firmware, e.g. stored in a memory 890, that when executed by the one or more processors such as the processor 880 perform as described above. One or more of these processors, as well as the other digital hardware, may be included in a single ASIC, or several processors and various digital hardware may be distributed among several separate components, whether individually packaged or assembled into a SoC.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from WiFi has been used in this disclosure to exemplify the embodiments herein, this should not be seen as limiting the scope of the embodiments herein to only the aforementioned system. Other wireless systems may also benefit from exploiting the ideas covered within this disclosure.

The invention claimed is:

1. A method performed by a transmitting station for assisting a receiving station in mitigating effects of a narrowband interference affecting the receiving station in a wireless communications network, the method comprising:
   determining a likelihood of a presence of the narrowband interference;
   determining whether the determined likelihood of the presence of the narrowband interference exceeds a threshold; and
   as a result of determining that the determined likelihood of the presence of the narrowband interference exceeds the threshold, sending to the receiving station a recommendation to avoid smoothing of the channel estimates of the receiving station, which recommendation indicates a high likelihood of presence of the narrowband interference.

2. The method of claim 1, wherein determining the likelihood of presence of the narrowband interference comprises computing a time slot occupancy of the narrowband interference.

3. The method of claim 1, wherein
   determining the likelihood of presence of the narrowband interference comprises determining a peak of the interference power spectrum density, and
   determining whether the determined likelihood of the presence of the narrowband interference exceeds a threshold comprises determining whether the peak of the interference power spectrum density exceeds a threshold of an interference power spectrum density.

4. The method of claim 3, wherein determining the likelihood of presence of the narrowband interference further comprises determining one or more of: a center of frequency of the narrowband interference and a bandwidth of the narrowband interference.

5. The method of claim 1, further comprising adjusting the Modulation and Coding Scheme (MCS) of a next packet based on determining that the likelihood of presence of the narrowband interference during a next packet transmission exceeds the threshold.

6. The method of claim 1, further comprising detecting narrowband interference in the band of operation of the receiving station.

7. The method of claim 1, further comprising determining that the receiving station is a sensor type station.

8. The method of claim 1, wherein the recommendation regarding smoothing consists of a smoothing indication bit.

9. The method of claim 1, wherein the transmitting station is an Access Point (AP) in an 802.11 network.

10. A transmitting station for assisting a receiving station in mitigating effects of a narrowband interference affecting the receiving station in a wireless communications network, which transmitting station is configured to:
    determine a likelihood of presence of the narrowband interference, and
    when the likelihood of presence of the narrowband interference exceeds a threshold of the likelihood, send to the receiving station a recommendation to avoid smoothing of the channel estimates of the receiving station, which recommendation indicates a high likelihood of presence of the narrowband interference.

11. The transmitting station of claim 10, wherein the transmitting station is configured to determine the likelihood of presence of the narrowband interference by computing a time slot occupancy of the narrowband interference.

12. The transmitting station of claim 10, wherein the transmitting station is configured to determine the likelihood of presence of the narrowband interference by determining a peak of the interference power spectrum density, and wherein the likelihood of presence of the narrowband interference exceeds the threshold of the likelihood when the peak of the interference power spectrum density exceeds a threshold of an interference power spectrum density.

13. The transmitting station of claim 12, wherein the transmitting station is configured to determine the likelihood of presence of the narrowband interference by determining any one or more out of: a center of frequency of the narrowband interference and a bandwidth of the narrowband interference.

14. The transmitting station of claim 10, further being configured to adjust the Modulation and Coding Scheme, MCS, of a next packet based on that the likelihood of presence of the narrowband interference during a next packet transmission exceeds the threshold of the likelihood.

15. The transmitting station of claim 10, further being configured to detect narrowband interference in the band of operation of the receiving station.

16. The transmitting station of claim 10, further being configured to determine that the receiving station is a sensor type station.

17. The transmitting station of claim 10, wherein the recommendation regarding smoothing is a smoothing indication bit.

18. The transmitting station of claim 10, wherein the transmitting station is an Access Point in an 802.11 network.

19. A method performed by a receiving station for mitigating effects of a narrowband interference affecting the receiving station in a wireless communications network, the method comprising:
   obtaining an indication of a high likelihood of presence of the narrowband interference; and
   based on the obtained indication, performing one or more of: adjusting a soft information related to a user data bit and avoiding smoothing of the channel estimates of the receiving station based on the indication.

20. The method of claim 19, wherein obtaining the indication of the high likelihood of presence of the narrowband interference comprises receiving the indication from a transmitting station, and wherein the indication is indicated by a recommendation to avoid smoothing of the channel estimates of the receiving station.

21. The method of claim 19, wherein obtaining the indication of the high likelihood of presence of the narrowband interference comprises detecting the narrowband interference.

22. The method of claim 19, further comprising determining the likelihood of presence of the narrowband interference.

23. The method of claim 19, further comprising determining that the likelihood of presence of the narrowband interference exceeds a threshold of the likelihood.

24. The method of claim 19, further comprising adjusting the soft information related to a user data bit which is affected by the interference.

25. The method of claim 19, wherein determining the likelihood of presence of the narrowband interference comprises determining the likelihood of presence of narrowband interference for an Orthogonal Frequency Division Multiplexing, OFDM, symbol.

26. A receiving station for mitigating effects of a narrowband interference affecting the receiving station in a wireless communications network, the receiving station being configured to:
   obtain an indication of a high likelihood of presence of the narrowband interference, and
   based on the indication, adjust a soft information related to a user data bit and/or avoid smoothing of the channel estimates of the receiving station based on the indication.

27. The receiving station of claim 26, wherein the receiving station is configured to obtain the indication of the high likelihood of presence of the narrowband interference by receiving the indication from a transmitting station, and wherein the indication is indicated by a recommendation to avoid smoothing of the channel estimates of the receiving station.

28. The receiving station of claim 26, wherein the receiving station is configured to obtain the indication of the high likelihood of presence of the narrowband interference by detecting the narrowband interference.

29. The receiving station of claim 26, further being configured to determine the likelihood of presence of the narrowband interference.

30. The receiving station of claim 26, further being configured to determine that the likelihood of presence of the narrowband interference exceeds a threshold of the likelihood.

31. The receiving station of claim 26, further being configured to:
   adjust the soft information related to a user data bit which is affected by the interference.

32. The receiving station of claim 26, wherein the receiving station is configured to determine the likelihood of presence of the narrowband interference by determining the likelihood of presence of narrowband interference for an Orthogonal Frequency Division Multiplexing, OFDM, symbol.

* * * * *